United States Patent
Fischer et al.

(10) Patent No.: US 6,696,533 B1
(45) Date of Patent: Feb. 24, 2004

(54) STABLE N-OXLY RADICAL ASSISTED EMULSION POLYMERIZATION UNDER PRESSURE

(75) Inventors: Michael Fischer, Ludwigshafen (DE); Bradley Ronald Morrison, Mannheim (DE); Heinz Friedrich Sutoris, Frankenthal (DE); Yvon Durant, Eppelheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/446,121

(22) PCT Filed: Jun. 18, 1998

(86) PCT No.: PCT/EP98/03699

§ 371 (c)(1),
(2), (4) Date: Dec. 27, 1999

(87) PCT Pub. No.: WO99/00427

PCT Pub. Date: Jan. 7, 1999

(30) Foreign Application Priority Data

Jun. 27, 1997 (DE) .......................................... 197 27 502
Aug. 15, 1997 (DE) .......................................... 197 35 222

(51) Int. Cl.$^7$ .............................. C08F 4/00; C08F 2/00; C08F 2/22; C08F 4/34
(52) U.S. Cl. .......................... 526/204; 526/73; 526/220; 526/232.5; 524/804
(58) Field of Search .................... 526/73, 204, 220, 526/232.5; 524/804

(56) References Cited

U.S. PATENT DOCUMENTS

| | | | |
|---|---|---|---|
| 4,581,429 A | 4/1986 | Solomon et al. | |
| 4,670,131 A | 6/1987 | Ferrell | |
| 5,322,912 A | 6/1994 | Georges et al. | |
| 5,322,960 A | 6/1994 | Sakamoto et al. | |
| 5,412,047 A | 5/1995 | Georges et al. | |
| 5,739,229 A * | 4/1998 | Keoshkerian et al. | ........ 526/215 |
| 6,258,911 B1 * | 7/2001 | George et al. | .............. 526/346 |

FOREIGN PATENT DOCUMENTS

| | | |
|---|---|---|
| CN | 1052847 | 7/1991 |
| DE | 1 618 141 | 10/1970 |
| DE | 197 04 714 | 7/1997 |
| DE | 196 51 307 | 6/1998 |
| EP | 0 135 280 | 3/1985 |
| GB | 1127127 | 9/1968 |
| WO | WO 96/24620 | 8/1996 |

OTHER PUBLICATIONS

G.J. Hawker, Trends in Polymer Science, vol. 4, No. 6, pps. 183–188, "Advances in 'Living' Free–Radical Polymerization: Architectural and Structural Control," Jun. 1996.

S.A.F. Bon, et al., Macromolecules, vol. 30, No. 2, pps. 324–326, "Controlled Radical Polymerization in Emulsion," 1997.

* cited by examiner

Primary Examiner—Kelechi C. Egwim
(74) Attorney, Agent, or Firm—Oblon, Spivak, McClelland, Maier & Neustadt, P.C.

(57) ABSTRACT

A process of free-radically initiated aqueous emulsion polymerization, in which monomers are polymerized in the presence of a N-oxyl radical and by means of special free-radical polymerization initiators at more than 100° C. and at pressures above the vapor pressure of the polymerization mixture.

16 Claims, No Drawings

STABLE N-OXLY RADICAL ASSISTED EMULSION POLYMERIZATION UNDER PRESSURE

The present invention relates to a process of free-radically initiated aqueous emulsion polymerization for preparing an aqueous polymer dispersion, where compounds having at least one ethylenically unsaturated group (monomers) are emulsified in an aqueous medium by means of dispersants and are polymerized by means of a free-radical polymerization initiator in the presence of an N-oxyl radical (a compound having at least one

group) which is derived from a secondary amine which carries no hydrogens on the α carbons (in other words, the N-oxyl groups are derived from corresponding secondary amino groups), to form an aqueous polymer dispersion. In this document, the abovementioned N-oxyl radicals will be referred to as stable N-oxyl radicals.

Aqueous polymer dispersions are fluid systems comprising, as the disperse phase, polymer particles in stable (storage stability in general $\geq 24$ h, normally $\geq 2$–3 days, usually $\geq 1$ week) disperse distribution in an aqueous dispersion medium. The number-average diameter of the polymer particles is generally from 0.01 to 1 $\mu$m.

Like polymer solutions when the solvent is evaporated, aqueous polymer dispersions have the property, when the aqueous dispersion medium evaporates, of forming polymer films, which is why aqueous polymer dispersions are widely employed in direct form as binders, for example for paints or compositions for coating leather.

In many cases, however, the dispersed polymer is also separated off by coagulation and used as a constituent in polymer blends to modify the mechanical properties. For this purpose, the polymer separated off from the aqueous polymer dispersion is extruded together, for example, with other thermoplastics, with or without the customary additives such as dyes, pigments, lubricants, stabilizers or fillers.

Aqueous polymer dispersions are mostly prepared by free-radically initiated aqueous emulsion polymerization of compounds having at least one ethylenically unsaturated group at below 100° C. In this case, the monomers to be polymerized, which are mainly of only little solubility in water, are emulsified in the aqueous medium without any great effort, for example by customary stirring, with the addition of dispersant and are polymerized by the action of free-radical polymerization initiators.

The free-radical polymerization initiators are usually water-soluble peroxides, hydroperoxides and/or azo compounds which, above a certain temperature, generally $\leq 100°$ C., dissociate into reactive free radicals which trigger the polymerization.

The term emulsion expresses the fact that the monomers and the water are present as a system of two liquids in more or less fine distribution and with little mutual solubility. The phrase aqueous emulsion expresses the fact that the aqueous phase forms the continuous phase. To prepare an aqueous monomer emulsion normally requires the addition of dispersants (for example, Ullmanns Encyklopädie der technischen Chemie, Vol. 10, 4th Edition, Verlag Chemie, Weinheim (1975), p. 449), which prevent the direct combination of two monomer droplets which happen to collide in the aqueous emulsion, and which ensure the stability of the resulting aqueous polymer dispersion.

As a result of the low dispersion effort, the aqueous monomer emulsion employed in connection with the free-radical aqueous emulsion polymerization usually consists predominantly of monomer droplets with a diameter of >1 $\mu$m.

Like all free-radically initiated polymerizations of compounds having at least one ethylenically unsaturated group, the process of free-radically initiated aqueous emulsion polymerization also has the disadvantage that the molecular weight of the polymer chains does not normally increase with the polymerization conversion and that the resulting polymer chains are not generally of uniform molecular weight. In other words, and in terms of its molecular weight, the polymer obtainable is generally not monodisperse but usually has a polydispersity index PDI in this regard of $\geq 2$ (PDI=$\overline{M}_w/\overline{M}_n$, where $\overline{M}_w$=weight-average molecular weight and $\overline{M}_n$=number-average molecular weight), which is attributed in particular to termination reactions as a consequence of the irreversible combination of growing free-radical polymer chain ends.

Another disadvantage of free-radically initiated aqueous emulsion polymerization is that a change made during polymerization to the monomers that are to be polymerized leads generally not to segmented copolymers (block polymers) but normally, at best, to dispersed core-shell polymer particles with a core composed of one type of monomer and a shell composed of the other type of monomer, the bond between core and shell being primarily not chemical but merely physical.

TRIP Vol. 4, No. 6, June 1996, p. 183 ff., U.S. Pat. No. 5,322,912, WO 96/24620, U.S. Pat. No. 4,581,429, U.S. Pat. No. 5,412,047, EP-A 135 280 and prior application DE-A 19602539 disclose that conducting free-radically initiated polymerizations at above 100° C. in the presence of a stable N-oxyl radical (that is, one essentially devoid of an initiating action) allows a certain degree of control of the free-radically initiated polymerization.

The mechanism on which the action is based is presumed to be that the stable N-oxyl radicals do not irreversibly terminate, but merely temporarily block, reactive free-radical ends of a growing polymer chain at elevated temperatures. The result of this is a reduction in the steady-state concentration of growing free-radical polymer chain ends, thereby reducing the possibility for irreversible termination of the chain growth through the combination of two growing polymer chain ends. This leads on average to polymer chains which grow in (ideally linear) proportion with the polymerization conversion. The result of this is an average molecular weight which grows in (ideally linear) proportion with the polymerization conversion, with the resulting polymer having a polydispersity index of 1.

According to U.S. Pat. No. 5,322,912, column 10, line 65 et seq. suitable reaction media for a controlled free-radically initiated polymerization of this kind include an emulsion. Further details regarding the implementation of such a free-radically initiated emulsion polymerization are not given by U.S. Pat. No. 5,322,912. The same applies to DE-A 19602539. The only recommendation made in U.S. Pat. No. 5,412,047, column 18, lines 54 et seq. for the case where free-radically initiated polymerization takes place in a multiphase system, as is the case with the free-radically initiated aqueous emulsion polymerization, is to use stable N-oxyl radicals which are of particularly low solubility in water.

The availability of an easy-to-implement, controlled, free-radically initiated aqueous emulsion polymerization for preparing an aqueous polymer dispersion would be advantageous insofar as it would enable the molecular weight of the resulting polymer, present in disperse distribution, to be adjusted in a controlled manner. This controlled adjustment determines, for example, the cohesion and adhesion of the resulting film of the aqueous polymer dispersion. In general there is a rise in the degree of cohesion as the molecular weight increases, whereas a decreasing molecular weight generally promotes the surface tack of the film. Moreover, the possibility of controlled adjustment opens up direct access to aqueous dispersions of tailor-made block copolymers, since the free-radical polymer chain ends are not destroyed by combination but only blocked reversibly. In other words, following the consumption of a first type of monomer, the polymerization can be continued with the addition of further types of monomer.

To prepare an aqueous polymer dispersion by controlled initiated aqueous emulsion polymerization, Macromolecules 1997, 30, pp. 324–326 recommends implementing said polymerization such that a preformed aqueous polymer dispersion (seed latex) is charged to a polymerization vessel and that to this initial charge there are added the monomers to be polymerized and also a hydrophobic compound which under the action of heat dissociates into a stable N-oxyl radical and a free-radical partner which initiates the polymerization. The reaction mixture is then left at room temperature in order to enable both the monomers to be polymerized and the hydrophobic compound to diffuse into the seed polymer particles (swelling). After swelling has taken place, the temperature is raised (>100° C.) in order to carry out polymerization under superatmospheric pressure. Disadvantages of this procedure are that it requires the prior preparation of the comparatively complex hydrophobic compound, and the extremely slow swelling process. Furthermore, it absolutely requires the prior preparation of a seed latex.

It is an object of the present invention to provide a more advantageous procedure of controlled free-radically initiated aqueous emulsion polymerization for preparing aqueous polymer dispersions.

We have found that this object is achieved by a process of free-radically initiated aqueous emulsion polymerization for preparing an aqueous polymer dispersion, where compounds having at least one ethylenically unsaturated group are emulsified in an aqueous medium by means of dispersants and are free-radically polymerized in the presence of a stable N-oxyl radical, which comprises a) using as free-radical polymerization initiator a peroxide, a hydroperoxide and/or an azo compound whose molal solubility at 25° C. and 1 bar in water is greater than or equal to the corresponding molal solubility of tert-butyl hydroperoxide in water and whose dissociation temperature in the polymerization medium is <100° C., b) conducting the free-radically initiated aqueous emulsion polymerization at more than 100° C., and c) conducting the free-radically initiated aqueous emulsion polymerization at pressures which are above the vapor pressure of the polymerization mixture present within the polymerization vessel.

Stable N-oxyl radicals suitable in accordance with the invention are all those specified in EP-A 135 280, prior application DE-A 19651307, U.S. Pat. No. 5,322,912, U.S. Pat. No. 4,581,429, WO 96/24620, U.S. Pat. No. 5,412,047 and prior application DE-A 19602539.

Examples of such suitable, stable N-oxyl radicals which are derived from a secondary amine are those of the formula I

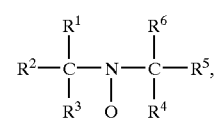

where $R^1, R^2, R^5$ and $R^6$=the same or different straight- or branched-chain, substituted or unsubstituted alkyls and $R^3$ and $R^4$=the same or different straight- or branched-chain, substituted or unsubstituted alkyls, or $R^3CNCR^4$=a substituted or unsubstituted cyclic structure.

Particularly suitable compounds I are those specified in EP-A 135 280, prior application DE-A 19651307, U.S. Pat. No. 5,322,912, U.S. Pat. No. 5,412,047, U.S. Pat. No. 4,581,429, DE-A 16 18 141, CN-A 1052847, U.S. Pat. No. 4,670,131, U.S. Pat. No. 5,322,960 and prior application DE-A 19602539.

Examples thereof are those stable N-oxyl radicals of the formula I in which $R^1$, $R^2$, $R^5$ and $R^6$ are (identical or different) methyl, ethyl, n-propyl, isopropyl, n-butyl, isobutyl, tert-butyl, linear or branched pentyl, phenyl or substituted groups thereof and $R^3$ and $R^4$ are (identical or different) methyl, ethyl, n-propyl, isopropyl, n-butyl, isobutyl, tert-butyl, linear or branched pentyl, substituted groups thereof or together with CNC the cyclic structure

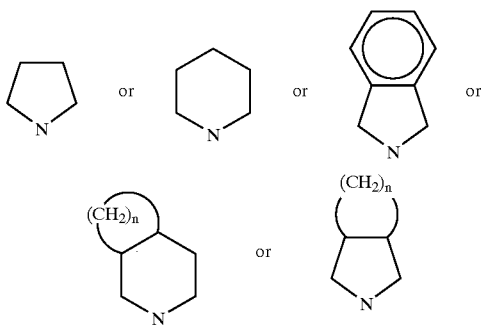

where n is an integer from 1 to 10 (in many cases from 1 to 6), including substituted forms of such cyclic structures. Typical examples are 2,2,6,6-tetramethyl-1-oxylpiperidine, 2,2,5,5-tetramethyl-1-oxylpyrrolidine and 4-oxo-2,2,6,6-tetramethyl-1-oxylpiperidine.

The stable N-oxyl radicals can be prepared from the corresponding secondary amines by oxidation, for example with hydrogen peroxide. In general they can be prepared as the pure substance. Stable N-oxyl radicals which are particularly advantageous in accordance with the invention are those whose molal solubility in the aqueous polymerization medium at 25° C. and 1 bar is $\geq 10^{-6}$ mol/kg, preferably $>10^{-5}$ mol/kg, very preferably $>10^{-4}$ mol/kg and, with special preference, $>10^{-3}$ mol/kg. In general, said solubility of stable N-oxyl radicals to be employed in accordance with the invention is not more than $10^{-1}$ mol/kg.

Stable N-oxyl radicals of enhanced solubility in an aqueous medium include, in particular, carboxylated, phosphonated, sulfonated and/or hydroxylated piperidine or pyrrolidine N-oxyls and di-N-oxyls of the following formulae II to IX:

(II) 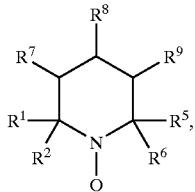

(III) 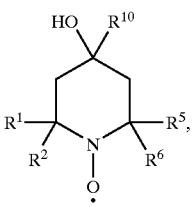

(IV) 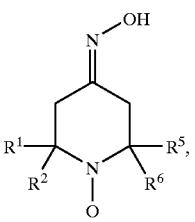

(V) 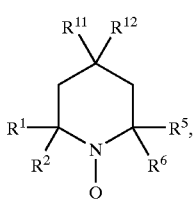

(VI) 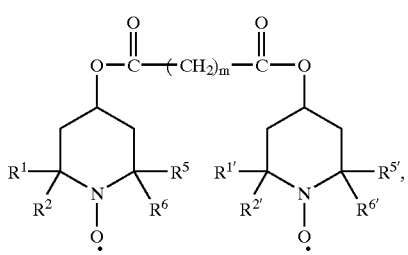

(VII) 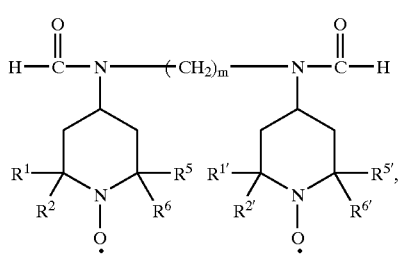

(VIII) 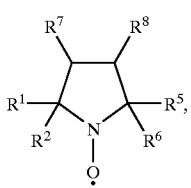

(IX) 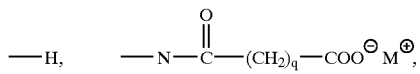

where m=from 2 to 10, $R^7$, $R^8$, $R^9$=independently of one another

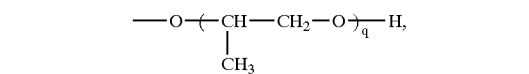

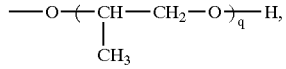

with the proviso that at least one of the substituents $R^7$, $R^8$ and $R^9$ present is different from hydrogen and $M^\oplus$ is a hydrogen ion or an alkali metal ion (especially $K^\oplus$ or $Na^\oplus$), q=an integer from 1 to 10, $R^{1'}, R^{2'}, R^{5'}, R^{6'}$=independently of one another and independently of $R^1$, $R^2$, $R^5$ and $R^6$ the same groups as $R^1$, $R^{10}$=$C_1$–$C_4$-alkyl, —CH=$CH_2$, —C≡CH, —CN,

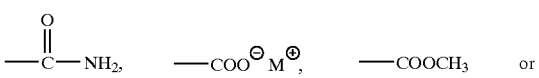

$R^{11}$ an organic radical with at least one primary, secondary (eg. —$NHR^1$) or tertiary amino group (eg. —$NR^1R^2$) or at least one ammonium group —$N^\oplus R^{14}R^{15}R^{16}X^\ominus$, where $X^\ominus$=$F^\ominus$, $Cl^\ominus$, $Br^\ominus$, $HSO_4^\ominus$, $SO_4^{2\ominus}$, $H_2PO_4^\ominus$, $HPO_4^{2\ominus}$ or $PO_4^{3\ominus}$ and $R^{14}$, $R^{15}$, $R^{16}$ independently of one another are organic radicals (eg. independently of one another and independently of $R^1$ the same groups as $R^1$), $R^{12}$=independently of $R^{11}$ the same groups as $R^{11}$ or —H, —OH, $C_1$–$C_4$-alkyl, —$COO^\ominus M^\oplus$, —C≡CH,

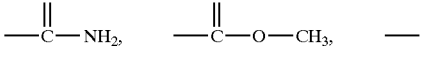

or hydroxy-substituted $C_1$–$C_4$-alkyl (eg. hydroxyethyl or hydroxypropyl), or $R^{11}$, $R^{12}$=together the oxygen of a carbonyl group and

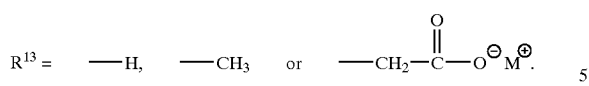

Preferably, $R^1=R^2=R^5=R^6=R^{1'}=R^{2'}=R^{5'}=R^{6'}=-CH_3$.

In many cases the molal solubility of the stable N-oxyl radicals in water already corresponds to the solubility values desired in accordance with the invention for the aqueous polymerization medium. If this is not the case, the solubility value preferred in accordance with the invention for the aqueous polymerization medium can be adjusted in a manner known per se, especially when the stable N-oxyl radical has an acidic or basic group as functional group, by varying the pH of the aqueous polymerization medium (for example by adding a base such as $NH_3$, KOH or NaOH, or by adding an acid, such as HCl, $H_2SO_4$ or $H_3PO_4$).

Typical examples of stable N-oxyl radicals which are suitable in accordance with the invention are 4-hydroxy-2,2,6,6-tetramethyl-1-oxylpiperidine, 4-hydroxy-2,6-diphenyl-2,6-dimethyl-1-oxylpiperidine, 4-carboxy-2,2,6,6-tetramethyl-1-oxylpiperidine, 4-carboxy-2,6-diphenyl-2,6-dimethyl-1-oxylpiperidine, 3-carboxy-2,2,5,5-tetramethyl-1-oxylpyrrolidine, 3-carboxy-2,5-diphenyl-2,5-dimethyl-1-oxylpyrrolidine and the sodium or potassium salt of the sulfuric monoester of 4-hydroxy-2,2,6,6-tetramethyl-1-oxylpiperidine.

The preparation of 3-carboxy-2,2,5,5-tetramethyl-1-oxylpyrrolidine, for example, is given in Romanelli, M.; Ottaviani, M. F.; Martini, G.; Kevan, L., JPCH J: Phys. Chem., EN, 93, 1, 1989, pp. 317–322.

Compounds (VI) and (VII) can be obtained in accordance with U.S. Pat. No. 4,665,185 (eg. Ex. 7) and DE-A 19510184.

Other suitable, typical examples are:

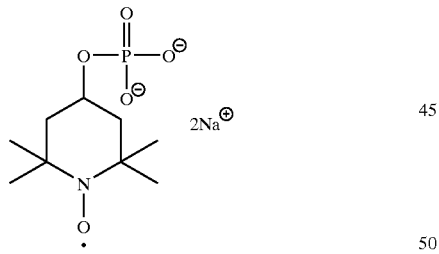

Sunamoto, Junzo; Akiyoshi, Kuzunari, Kihara, Tetsuji; Endo, Masayuki, BCSJA 8, Bull, Chem. Soc. Jpn., EN, 65, 4, 1992, pp. 1041–1046;

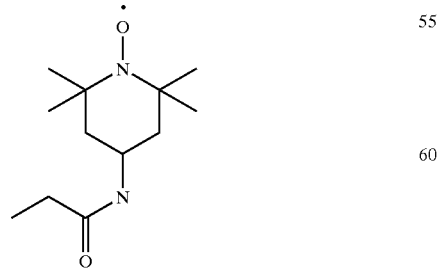

Beilstein Registry Number 6926369 ($C_{11}H_{22}N_3O_2$);

-continued

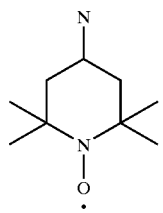

Beilstein Registry Number 6498805 (4-amino-2, 2, 6, 6-tetramethyl-1-oxyl-piperidine);

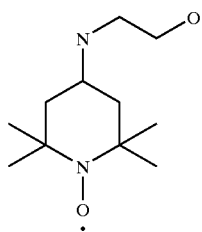

Beilstein Registry Number 6800244 ($C_{11}H_{23}N_2O_2$);

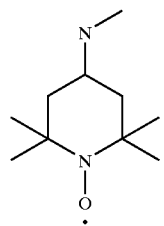

Beilstein Registry Number 5730772 (N-methyl-4-amino-2, 2, 6, 6-tetramethyl-1-oxylpiperidine;

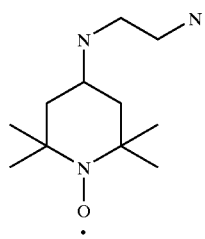

Beilstein Registry Number 5507538 (2, 2, 6, 6-tetramethyl-4-(2-amino-ethylamino)-1-oxylpiperidine);

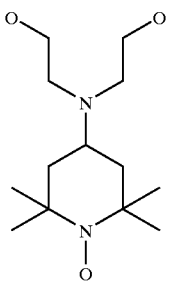

Beilstein Registry Number 4417950 (4<bis(2-hydroxyethyl)>-amino-2, 2, 6, 6-tetramethyl-1-oxylpiperidine);

-continued

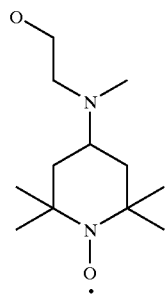

Beilstein Registry Number 4396625
($C_{12}H_{25}N_2O_2$);

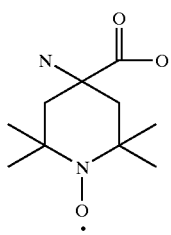

Beilstein Registry Number 4139900
(4-amino-2, 2, 6, 6-tetramethyl-4-carboxy-1-oxylpiperidine);

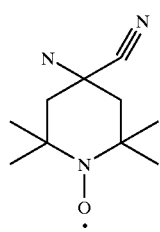

Beilstein Registry Number 4137088
(4-amino-4-cyano-2, 2, 6, 6-tetramethyl-1-oxylpiperidine);

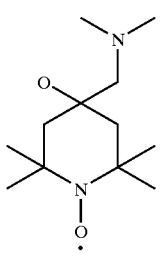

Beilstein Registry Number 3942714
($C_{12}H_{25}N_2O_2$);

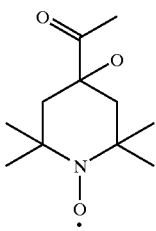

Beilstein Registry Number 1468515
(2, 2, 6, 6-tetramethyl-4-hydroxy-4-acetyl-1-oxylpiperidine);

-continued

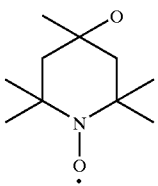

Beilstein Registry Number 1423410
(2, 2, 4, 6, 6-pentamethyl-4-hydroxy-1-oxylpiperidine);

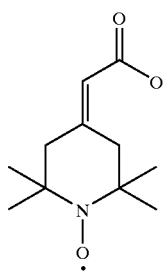

Beilstein Registry Number 6205316
(4-carboxymethylene-2, 2, 6, 6-tetramethyl-1-oxylpiperidine);

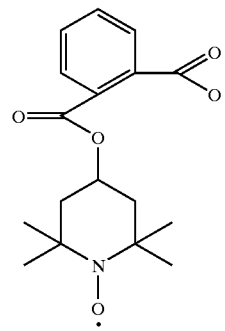

Beilstein Registry Number 1395538
(4-<2-carboxybenzoyloxy>-2, 2, 6, 6-tetramethyl-1-oxylpiperidine);

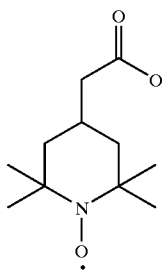

Beilstein Registry Number 3546230
(4-carboxymethyl-2, 2, 6, 6-tetramethyl-1-oxylpiperidine);

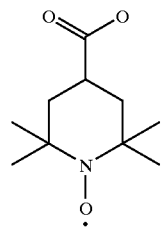

Beilstein Registry Number 3949026
(4-carboxyl-2, 2, 6, 6-tetramethyl-1-oxylpiperidine);

-continued

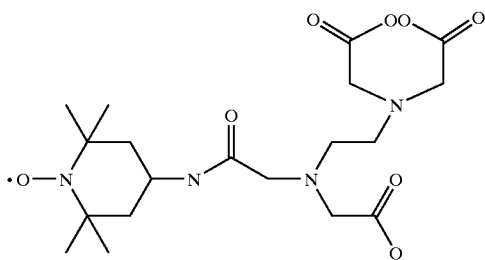

Beilstein Registry Number 4611003 (ethylenediaminetetra- acetic acid mono (1-oxyl-2, 2, 6, 6- tetramethylpiperidinyl-4- amide);

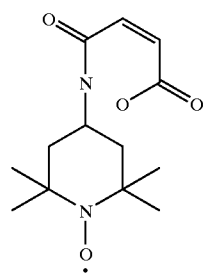

Beilstein Registry Number 5961636 ($C_{13}H_{21}N_2O_4$)

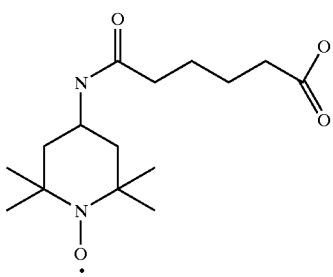

Beilstein Registry Number 5592232 ($C_{15}H_{27}N_2O_4$);

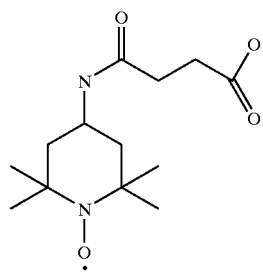

Beilstein Registry Number 5080576 (succinic acid N-(2, 2, 6, 6-tetra- methyl-1-oxyl-4-piperidinyl)-mono- amide);

-continued

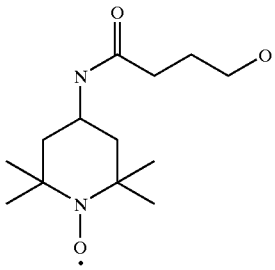

Beilstein Registry Number 5051814 (4-(4-hydroxybutanoylamino)-2, 2, 6, 6- tetramethyl-1-oxylpiperidine);

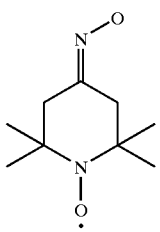

Beilstein Registry Number 4677496 (2, 2, 6, 6-tetramethyl-4-oximino-1- oxylpiperidine);

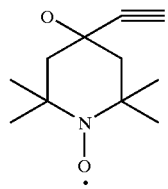

Beilstein Registry Number 1451068 ($C_{11}H_{18}NO_2$);

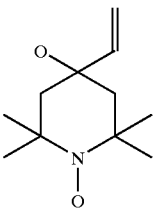

Beilstein Registry Number 1451075 ($C_{11}H_{20}NO_2$);

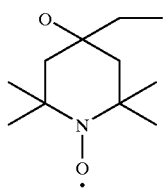

Beilstein Registry Number 1423698 (4-ethyl-4-hydroxy-2, 2, 6, 6-tetra- methyl-1-oxylpiperidine);

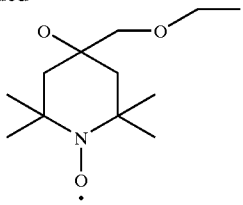

Beilstein Registry Number 5509793
(4-ethoxymethyl-4-hydroxy-2, 2, 6, 6
-tetramethyl-1-oxylpiperidine);

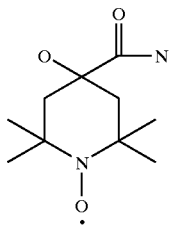

Beilstein Registry Number 3960373
($C_{10}H_{19}N_2O_3$);

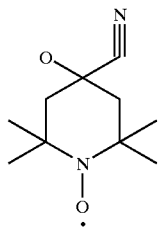

Beilstein Registry Number 4137089
($C_{10}H_{17}N_2O_2$);

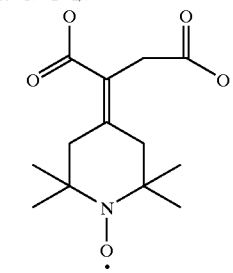

Beilstein Registry Number 3985130
(2, 2, 6, 6-tetramethyl-1-oxyl-4-
piperidylidene) succinic acid).

It is of course also possible in accordance with the invention to employ mixtures of stable N-oxyl radicals. It is surprising that in accordance with the invention it is possible to use stable N-oxyl radicals whose molal solubility in the aqueous polymerization medium at 25° C. and 1 bar is greater than the corresponding molal solubility in the monomers to be polymerized or in the mixture of monomers to be polymerized.

Free-radical polymerization initiators which are suitable in accordance with the invention are, for example, azo compounds, such as 4,4'-azobiscyanovaleric acid, hydroperoxides, such as tert-butyl hydroperoxide and/or peroxides such as hydrogen peroxide or peroxodisulfuric acid and the alkali metal salts thereof (especially $K^{\oplus}$ and $Na^{\oplus}$ salt). Other suitable free-radical polymerization initiators are given in Ullmanns Encyclopädie der Technischen Chemie, Verlag Chemie, Weinheim, 4th Edition, Volume 15, p. 187 ff. It is also possible to make use of combined systems composed of at least one organic reducing agent and at least one peroxide and/or hydroperoxide, for example tert-butyl hydroperoxide and the sodium salt of hydroxymethanesulfinic acid, or hydrogen peroxide and ascorbic acid. Also suitable are combined systems which, in addition to reducing agent and peroxide, contain a small amount of a metal compound which is soluble in the polymerization medium and whose metallic component can exist in two or more valence states, an example being ascorbic acid/iron(II) sulfate/hydrogen peroxide.

Based on the molar amount of monomers to be subjected to free-radical polymerization, the amount of free-radical polymerization initiator employed in the novel process is generally from $10^{-6}$ to 2 mol-%, usually from $10^{-4}$ to 1 mol-%, and is guided in a manner known per se by the desired molecular weight of the resulting polymer in disperse distribution.

The molar ratio of stable N-oxyl radicals to free-radical polymerization initiator, in the case of the novel process, is normally from 0.5 to 5, preferably from 0.8 to 4.

By adding organic acids, such as camphorsulfonic acid or p-toluenesulfonic acid (U.S. Pat. No. 5,322,912), or by adding dimethyl sulfoxide (U.S. Pat. No. 5,412,047) or indolylacetic acid to the polymerization mixture it is generally possible to raise the rate of polymerization in the novel process.

Dispersants which are suitable in accordance with the invention are, in particular, the emulsifiers which are commonly employed in the context of free-radically initiated aqueous emulsion polymerizations. Examples of these are block copolymers of ethylene oxide and propylene oxide, ethoxylated mono-, di- and trialkylphenols (for example EO units: 3 to 50 and alkyl: $C_4$–$C_9$), ethoxylated fatty alcohols (for example EO units: 3 to 50 and alkyl: $C_8$–$C_{36}$), and also alkali metal salts and ammonium salts of alkyl sulfates (for example alkyl: $C_8$–$C_{30}$), of sulfuric monoesters of ethoxylated alkanols (for example EO units: 4 to 30 and alkyl: $C_{12}$–$C_{30}$) and of ethoxylated alkylphenols (for example EO units: 3 to 50 and alkyl: $C_4$–$C_{15}$), of alkylsulfonic acids (for example alkyl: $C_{12}$–$C_{35}$) and of alkylarylsulfonic acids (for example alkyl: $C_9$–$C_{35}$).

Further suitable dispersants are compounds of the formula X

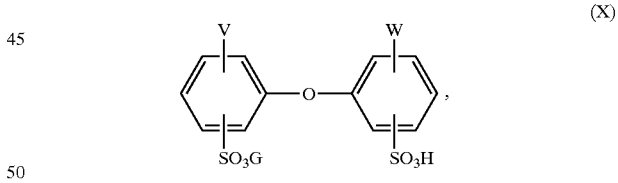

(X)

where V and W are hydrogen or $C_4$–$C_{14}$-alkyl but are not hydrogen at the same time, and G and H can be alkali metal ions and/or ammonium ions. Preferably, V and W are linear or branched alkyls of 6 to 18 carbons or hydrogen, and especially of 6, 12 and 16 carbons, and are not both simultaneously hydrogen. G and H are preferably sodium, potassium or ammonium ions, particular preference being given to sodium. Particularly advantageous compounds X are those in which G and H are sodium, V is a branched alkyl of 12 carbons and W is hydrogen or V. Use is frequently made of technical-grade mixtures with a proportion of from 50 to 90% by weight of the monoalkylated product, for example Dowfax® 2A1 (trademark of Dow Chemical Company). The compounds X are generally known, for example from U.S. Pat. No. 4,269,749, and are obtainable commercially.

Based on the monomers to be polymerized, the amount of dispersant to be used in accordance with the invention is generally from 0.1 to 10% by weight. At the beginning of the novel, free-radically initiated aqueous emulsion polymerization the amount of emulsifier is generally chosen so as to be above the critical micelle concentration.

Examples of monomers having at least one ethylenically unsaturated group are olefins such as ethylene or propylene, vinylaromatic monomers such as styrene, 2-vinylnaphthalene and 9-vinylanthracene, substituted vinylaromatic monomers such as p-methylstyrene, α-methylstyrene, o-chlorostyrene, p-chlorostyrene, 2,4-dimethylstyrene and 4-vinylbiphenyl, esters of vinyl alcohol with $C_1$–$C_{18}$ monocarboxylic acids, such as vinyl acetate, vinylpropionate, vinyl n-butyrate, vinyl laurate and vinyl stearate, esters of $C_3$–$C_6$ α,β-monoethylenically unsaturated mono- and dicarboxylic acids, such as in particular acrylic acid, methacrylic acid, maleic acid, fumaric acid and itaconic acid, with generally $C_1$–$C_{20}$, frequently $C_1$–$C_{12}$, usually $C_1$–$C_8$ and with particular frequency $C_1$–$C_4$ alkanols, especially methyl, ethyl, n-butyl, isobutyl, tert-butyl and 2-ethylhexyl acrylate and methacrylate, dimethyl maleate or n-butyl maleate, the nitriles of the abovementioned α,β-monoethylenically unsaturated carboxylic acids, such as acrylonitrile and methacrylonitrile, and $C_{4-8}$ conjugated dienes such as 1,3-butadiene and isoprene. These monomers generally constitute the principal monomers which, based on the overall amount of monomers to be polymerized, normally make up a proportion of more than 50% by weight. Monomers which when polymerized alone usually give homopolymers of increased solubility in water are normally copolymerized only as modifying monomers in amounts, based on the overall amount of monomers to be polymerized, of less than 50% by weight, generally from 0 to 20% by weight and, in the majority of cases, from 0 to 10% by weight.

Examples of such monomers are $C_3$–$C_6$ α,β-monoethylenically unsaturated mono- and dicarboxylic acids and their anhydrides and amides, examples being acrylic acid, methacrylic acid, maleic acid, fumaric acid, itaconic acid, acrylamide and methacrylamide, and also the monoesters of these carboxylic acids with polyhydric alcohols, such as hydroxyethyl acrylate, hydroxypropyl acrylate, and also vinylsulfonic acid and N-vinylpyrrolidone.

The novel process can preferably be applied to the monomers styrene, vinyltoluene, $C_1$–$C_8$-alkyl (meth)acrylates, especially n-butyl acrylate, 2-ethylhexyl acrylate or methyl methacrylate, and acrylonitrile and to monomer mixtures composed to the extent of at least 85% by weight of these monomers or of mixtures of these monomers.

In accordance with the invention it is possible in a comparatively controlled way to produce random, alternating or segmented copolymers, especially diblock and triblock copolymers, from the abovementioned monomers present in the aqueous medium in disperse distribution. Of particular importance is the novel preparation of poly(n-butyl acrylate) and of block copolymers comprising poly(n-butyl acrylate) as at least one segment. By appropriate control of the supply of monomers to be polymerized it is also possible to prepare gradient polymers, ie. polymers with a decreasing or increasing content of comonomer along the polymer chain. In the case of triblock copolymers A-block-B-block-C-block, the blocks A and C can be composed of identical or different monomers. The glass transition temperature of the blocks can be chosen as desired. For example, the chemical composition of blocks A and C can be chosen such that their glass transition temperature is $\geq 0°$ C. At the same time, the chemical composition of block B can be chosen such that its glass transition temperature is $<0°$ C. In this context more than 70% by weight, for example, of the block B can be composed of $C_1$–$C_8$ (meth)acrylates in polymerized form. In this context the block B is frequently composed of n-butyl acrylate, 2-ethylhexyl acrylate or mixtures thereof in polymerized form.

Comonomers which can be incorporated by polymerization can also of course be those having more than one vinyl group. The result of this is crosslinked polymers. It is particularly advantageous in accordance with the invention to prepare aqueous polymer dispersions whose dispersed polymer particles have a core/shell morphology. The advantageousness of this results, in particular, from an enhanced attachment of the shell to the core. A core/shell morphology is generally obtainable when, with the period of polymerization, a change in monomer is made and at the same time the new formation of dispersed polymer particles is essentially suppressed. Preferably, monomers with a crosslinking action are copolymerized into the core. The core can be composed, for example, of polystyrene or polymethyl methacrylate or of a copolymer of styrene and acrylonitrile and can have a glass transition temperature $\geq 25°$ C. The first shell can consist, for example, of polybutadiene, poly-n-alkyl acrylate, such as poly-n-butyl acrylate, or copolymers with a glass transition temperature $Tg<0°$ C. This can be followed by one or more additional hard shells (for example composed of polystyrene, polymethyl methacrylate or poly-styrene-acrylonitrile copolymer) having a $Tg \geq 25°$ C.

Following their isolation, such core/shell polymer particles can be used as additives to modify other plastics.

The molecular weight of the polymers obtainable in accordance with the invention and present in dispersion in the aqueous medium can be adjusted in a simple manner by reducing the polymerization temperature at the desired point in time and so freezing the blockage of the growing polymer chain ends by the stable N-oxyl radicals. In general this takes place below 100° C. Such a blockage can be reversed by raising the temperature. An alternative for adjusting the molecular weight is to limit the amount of monomers to be polymerized. An irreversible adjustment of the molecular weight is provided by the addition of conventional molecular weight regulators, such as esters of thioglycolic acid and 2-ethylhexanol or tert-dodecyl mercaptan. Adding them terminates the growing polymer chain ends irreversibly and frees the polymer chains from the stable N-oxyl radicals, which can be eliminated subsequently, for example, by appropriate extraction.

In accordance with the invention it is therefore possible to obtain, in a simple manner, aqueous dispersions of polymers whose weight-average molecular weight $\overline{M}_w$ has specific values of from $\geq 1000$ to 250,000, or $\geq 10,000$ to 250,000. The polydispersity indices of the molecular weight can be $<2$, frequently $<1.5$. In the case of block copolymers, this applies to the individual segments as well.

The polymerization temperature is advantageously, in accordance with the invention, $>100°$ C. to 180° C., in particular from 120 to 150° C.

It is essential to the invention that polymerization is conducted at a pressure which is above the vapor pressure of the polymerization mixture at the appropriate polymerization temperature. This pressure can be $>1$ bar to 1000 bar, advantageously from 2 to 20 bar and, with very special advantage, from 4 to 10 or from 5 to 7 bar.

The desired pressure conditions can be established in a simple manner by establishing an initial pressure in the polymerization reactor, before the polymerization mixture is heated to the desired polymerization temperature, by means of inert gases such as, for example, methane, $CO_2$, CO, Ar, He or $N_2$. Such an initial pressure may typically be from 3 to 5 bar, for example. The closed polymerization reactor is then brought to the polymerization temperature. The novel free-radically initiated aqueous emulsion polymerization is normally conducted in the absence of molecular oxygen.

It is of course also possible, however, to carry out the polymerization in the presence of molecular oxygen. In other words, the desired initial pressure can also be established by means of air, for example, or else using gaseous monomers such as butadiene or ethylene, alone or in a mixture with the abovementioned gases. The initial pressure is usually established at temperatures <100° C., generally at from 0° C. to 75° C. or from 25° C. to 75° C. Polymerization frequently takes place in the presence of pH buffers such as sodium bicarbonate.

The novel process can be implemented in a particularly simple manner by charging all of the constituents of the polymerization mixture (incuding the aqueous phase) to the stirred polymerization vessel, establishing the desired initial pressure and then establishing the desired polymerization temperature, while continuing to carry out stirring within the closed polymerization vessel, and then conducting polymerization to the desired degree of conversion while continuing the polymerization. In many cases the temperature is first of all established at a level from 50° C. up to <100° C., in order to trigger the dissociation of the free-radical polymerization initiator. Heating to the actual polymerization temperature is then carried out. It is of course also possible to supply the monomers that are to be polymerized to the polymerization vessel in stages and/or under a gradient. Similarly, the stable N-oxyl radicals and the free-radical polymerization initiator that is used can be added to the polymerization mixture before, during or after the end of a polymerization step. The solids content of the resulting aqueous polymer dispersion is generally from 20 to 50% by volume. However, if required it can be up to 75% by volume. The diameter of the dispersed polymer particles of the resulting aqueous polymer dispersion can be increased by chemical agglomeration and/or pressure agglomeration. To monitor the diameters of the polymer particles present in the resulting aqueous polymer dispersion it is possible in accordance with the invention and of course to add seed latices. This can be done before or during the implementation of the novel free-radically initiated aqueous emulsion polymerization. Unlike the process of the closest prior art, however, in accordance with the invention it is not necessary to swell such seed polymer particles. A seed procedure is employed in particular when a broad diameter distribution of the resulting polymer particles is desired. The aqueous seed polymer dispersion used in accordance with the invention is advantageously one which has likewise been prepared in accordance with the novel polymerization procedure.

In accordance with the invention it is possible to obtain aqueous polymer dispersions whose dispersed polymer particles consist of polymer with the following structure:

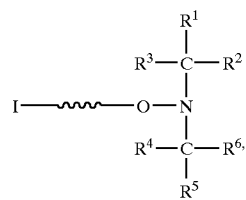

where

I=residue of the free-radical polymerization initiator and ⌇⌇⌇ =branched or linear copolymer.

If a free-radical polymerization initiator is used which on thermal dissociation produces fragments having more than one free-radical functionality, the following structures are also possible:

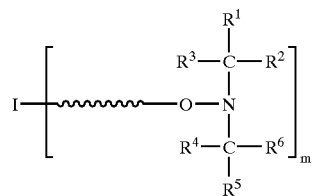

where m=1 to 4.

Similar structures are possible if polyfunctional stable N-oxyl radicals are used, in other words compounds having more than one N-oxyl radical group.

Where ⌇⌇⌇ is a block copolymer comprising a hydrophobic and a hydrophilic block, the abovementioned structures are suitable as dispersants (cf. prior application DE-A 19648029).

A disadvantage of the free-radically initiated aqueous emulsion polymerization according to the invention is its in some cases comparatively low reaction rate. With this in mind it may be judicious to combine the novel procedure with a conventional free-radically initiated aqueous emulsion polymerization. This can be done, for example, by beginning in conventional fashion and then proceeding in accordance with the invention, or vice versa.

In the latter case, for example, free-radical polymerization initiator is added in excess (based on the amount of N-oxyl radical present) at the point in time which is considered appropriate.

In both cases the polydispersity of the resulting polymer is increased.

EXAMPLES

General Remarks

The monomers and polymerization auxiliaries used in the examples below were used without further purification, in other words as acquired. Stable N-oxyl radicals employed were 4-hydroxy-2,2,6,6-tetramethyl-1-oxylpiperidine from Hüls AG (4-hydroxy-TEMPO), 2,2,6,6-tetramethyl-1-oxylpiperidine from Aldrich (TEMPO) and the potassium salt of the sulfuric monoester of 4-hydroxy-2,2,6,6-tetramethyl-1-oxyl-piperidine, synthezied in house (TEMPO-O-$SO_3$K). The molal solubilities of the three stable N-oxyl radicals mentioned above are, at 25° C. and 1 atm in water:

| | |
|---|---|
| TEMPO: | 6.4 · 10⁻⁵ mol/kg |
| 4-Hydroxy-TEMPO: | 3.25 · 10⁻³ mol/kg |
| TEMPO-O-SO₃K: | 2.55 · 10⁻³ mol/kg |

The molecular weights were determined by means of GPC (gel permeation chromatography) with calibration by polystyrene standards.

Preparing Potassium 2,2,6,6-Tetramethylpiperidine-1-oxyl-4-sulfate (TEMPO-O-SO₃K)

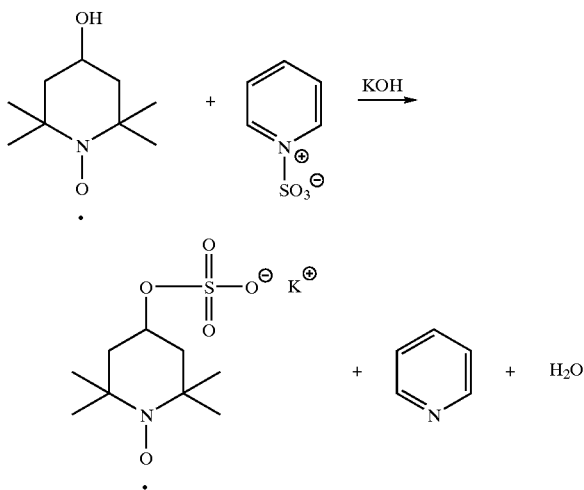

A solution of 15.9 g (0.1 mol) of sulfur trioxide/pyridine complex (1:1) in 80 ml of acetonitrile was added dropwise at 80° C. with stirring to a solution of 18 g (0.1 mol) of 4-hydroxy-TEMPO (from Hüls AG) in 70 ml of acetonitrile. The reaction mixture was subsequently stirred at boiling temperature (under reflux) for 5 h and then at 25° C. for 12 h more.

The acetonitrile was subsequently removed by distillation under reduced pressure. Then a solution of 0.1 mol of KOH in 80 ml of water was added. The resulting aqueous solution was subjected to extraction seven times in succession with 150 ml of ethyl acetate each time (to separate pyridine formed and unreacted starting compounds). The aqueous phase which remains was concentrated under reduced pressure and the residue was subsequently dried in a high vacuum, giving 20.2 g of TEMPO-O-SO₃K.

(Additional synthesis options are given, for example, in Melhorn, Rolf Joachim; Packer, Lester, CJCHAG, Can. J.C. EN, 60, 1982, pp. 1452–1462 and in Sunamoto, Junzo; Akiyoshi, Kazunari, Kihara, Tetsuji; Endo, Masayuki, BCSJA8, Bull. Chem. Soc. Jpn., EN, 65, 4, 1992, pp. 1041–1046.)

Example 1

A stirred 5 l pressure vessel was charged at 25° C. with 1550 g of water, 4.7 g of sodium bicarbonate, 9.3 g of the potassium salt of a C₃₀-alkylsulfonic acid, 3.6 g of 4-hydroxy-TEMPO, 3.8 g of potassium peroxodisulfate, 281 g of styrene and 94 g of acrylonitrile. Then an initial pressure of 4 bar was established in the polymerization vessel by means of molecular nitrogen and the polymerization mixture was heated to 95° C. This temperature was maintained for 30 minutes. It was subsequently raised to 120° C., and polymerization was conducted at this temperature (and at a pressure of about 7 bar) for 12 h. The mixture was subsequently cooled to 60° C., 200 g. of n-butyl acrylate were added, the mixture was heated to 120° C., and polymerization was continued at 120° C. and about 7 bar for a further 12 h. The resulting aqueous polymer dispersion had a solids content of 13% by weight and was free from coagulum.

For this polymerization, the weight-average molecular weight $\overline{M}_w$ of the resulting polymer was determined as a function of the total polymerization period at 120° C. The results are shown in Table 1.

TABLE 1

| Polymer | Total polymerization period [120° C., h] | $\overline{M}_w$ |
|---|---|---|
| Poly-styrene-acrylonitrile | 4 | 9800 |
| Poly-styrene-acrylonitrile | 6 | 13600 |
| Poly-styrene-acrylonitrile | 12 | 28000 |
| Poly-styrene-acrylonitrile-poly-butyl acrylate | 15 | 31500 |
| Poly-styrene-acrylonitrile-poly-butyl acrylate | 18 | 35900 |
| Poly-styrene-acrylonitrile-poly-butyl acrylate | 24 | 42000 |

The increase in molecular weight with the period of polymerization is evidence of the controlled nature of the free-radically initiated aqueous emulsion polymerization.

Comparative Example

Example 1 was repeated but without the establishment of an initial pressure lying above the vapor pressure of the polymerization mixture. After a short polymerization period at 120° C. (at about 4 bar) the aqueous polymer dispersion became unstable and coagulated.

Example 2

A stirred 5 l pressure vessel was charged at 25° C. with 1500 g of water, 4.7 g of sodium bicarbonate, 9.3 g of the potassium salt of a C₃₀-alkylsulfonic acid, 3.6 g of 4-hydroxy-TEMPO, 3.8 g of potassium peroxodisulfate and 375 g of styrene. Then an initial pressure of 4 bar was established in the polymerization vessel by means of molecular nitrogen and the polymerization mixture was heated to 95° C. This temperature was maintained for 30 minutes. It was subsequently raised to 120° C., and polymerization was conducted at this temperature (at about 7 bar) for 44 h. At a polymerization conversion of 70% by weight, the polymerization was terminated by cooling to room temperature. The resulting aqueous polymer dispersion had a solids content of 14.5% by weight and was free from coagulum. For this polymerization, the weight-average molecular weight $\overline{M}_w$ and the PDI of the resulting polymer was determined as a function of the total polymerization period at 120° C.

The results are shown in Table 2.

TABLE 2

| Polymer | Total polymerization period [120° C., h] | $\overline{M}_w$ | PDI |
|---|---|---|---|
| Polystyrene | 3 | 6800 | 1.45 |
| Polystyrene | 19 | 18900 | 1.34 |

TABLE 2-continued

| Polymer | Total polymerization period [120° C., h] | $\overline{M}_w$ | PDI |
|---|---|---|---|
| Polystyrene | 29 | 25300 | 1.42 |
| Polystyrene | 44 | 33000 | 1.46 |

There is a marked increase in average molecular weight with the polymerization period. The molecular weight distribution remains narrow even at high polymerization conversions.

Example 3

Example 2 was repeated but using 3.6 g of TEMPO instead of 3.6 g of 4-hydroxy-TEMPO. After polymerization for 44 hours at 120° C. the polymerization was terminated by cooling to room temperature. The polymerization conversion was 83.5% by weight. The solids content of the resulting aqueous polymer dispersion was 17.2% by weight. The corresponding time-dependent results are shown in Table 3.

TABLE 3

| Polymer | Total polymerization period [120° C., h] | $\overline{M}_w$ | PDI |
|---|---|---|---|
| Polystyrene | 3 | 9800 | 1.31 |
| Polystyrene | 19 | 10800 | 1.29 |
| Polystyrene | 29 | 12600 | 1.33 |
| Polystyrene | 44 | 14300 | 1.65 |

The increase in the weight-average molecular weight with the polymerization period is less pronounced than in Example 2. The polydispersity of the molecular weight likewise increases more sharply at high polymerization conversions than in Example 2.

Example 4

Example 2 was repeated but using 5.3 g of TEMPO-O-SO$_3$K instead of 3.6 g of 4-hydroxy-TEMPO. After polymerization for 7 hours at 120° C. the polymerization was terminated by cooling to room temperature. The polymerization conversion was 98.5% by weight. The solids content of the resulting aqueous polymer dispersion was 20.4% by weight. The corresponding time-dependent results are shown in Table 4.

TABLE 4

| Polymer | Total polymerization period [120° C., h] | $\overline{M}_w$ | PDI |
|---|---|---|---|
| Polystyrene | 0.5 | 247100 | 3.53 |
| Polystyrene | 1.5 | 279000 | 2.96 |
| Polystyrene | 2 | 292800 | 2.91 |
| Polystyrene | 3 | 306700 | 2.76 |
| Polystyrene | 6 | 323500 | 2.61 |
| Polystyrene | 7 | 328000 | 2.72 |

We claim:

1. A process of free-radically initiated aqueous emulsion polymerization for preparing an aqueous polymer dispersion, where compounds having at least one ethylenically unsaturated group are emulsified in an aqueous medium by means of dispersants and are free-radically polymerized in the presence of a stable N-oxyl radical, which comprises a) using as free-radical polymerization initiator a peroxide, a hydroperoxide and/or an azo compound whose molal solubility at 25° C. and 1 bar in water is greater than or equal to the corresponding molal solubility of tert-butyl hydroperoxide in water and whose dissociation temperature in the polymerization medium is <100° C., b) conducting the free-radically initiated aqueous emulsion polymerization at a polymerization temperature of more than 100° C., and c) conducting the free-radically initiated aqueous emulsion polymerization at pressures which are above the vapor pressure of the polymerization mixture present within the polymerization vessel, said pressures being established by means of an inert gas or molecular oxygen prior to heating the polymerization mixture to the polymerization temperature.

2. A process as claimed in claim 1, wherein the stable N-oxyl radical used is a compound of the formula I

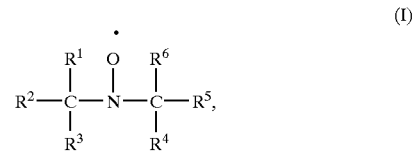

where

R$^1$, R$^2$, R$^5$, R$^6$=the same or different straight- or branched-chain, substituted or unsubstituted alkyls and R$^3$, R$^4$=the same or different straight- or branched-chain, substituted or unsubstituted alkyls, or R$^3$CNCR$^4$=a substituted or unsubstituted cyclic structure.

3. A process as claimed in claim 1, wherein the stable N-oxyl radical used is a compound of one of the following formulae II to IX:

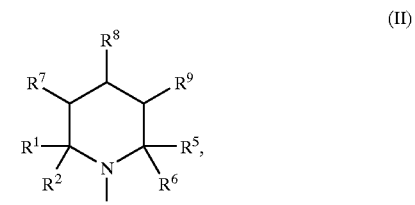

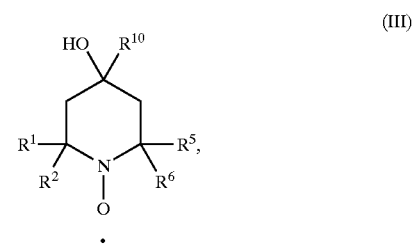

-continued (IV)

[Structure: 4-hydroxyimino-2,2,6,6-tetrasubstituted piperidine-1-oxyl radical with substituents R¹, R², R⁵, R⁶]

(V)

[Structure: 4,4-disubstituted (R¹¹, R¹²) 2,2,6,6-tetrasubstituted piperidine-1-oxyl radical]

(VI)

[Structure: bis-piperidinyl-N-oxyl diester linked through —O—C(O)—(CH₂)ₘ—C(O)—O—]

(VII)

[Structure: bis-piperidinyl-N-oxyl diamide H—C(O)—N—(CH₂)ₘ—N—C(O)—H linkage]

(VIII)

[Structure: pyrrolidine-1-oxyl radical with R⁷, R⁸ at 3,4-positions and R¹, R², R⁵, R⁶]

(IX)

[Structure: R¹³—CH—C(O)—O⁻ M⁺ substituted piperidine-1-oxyl]

where
m = from 2 to 10,
R⁷, R⁸, R⁹ = independently of one another $$-H, \quad -N-\overset{O}{\underset{\|}{C}}-(CH_2)_q-COO^\ominus M^\oplus, \quad -NH_2,$$

$$-O-\overset{O}{\underset{\|}{C}}-(CH_2)_q-COO^\ominus M^\oplus, \quad -COO^\ominus M^\oplus,$$

$$-SO_3^\ominus M^\oplus, \quad -PO_3^\ominus M^\oplus, \quad -O-PO_3^{2\ominus} M_2^\oplus,$$

$$-O-SO_3^\ominus M^\oplus, \quad -OH,$$

$$-O-(CH_2-CH_2-O)_q-H \quad \text{oder} \quad -O-(\underset{CH_3}{\overset{|}{CH}}-CH_2-O)_q-H,$$

with the proviso that at least one of the substituents R⁷, R⁸ and R⁹ present is different from hydrogen
M⁺ = a hydrogen ion or an alkali metal ion,
q = an integer from 1 to 10,
R¹', R²', R⁵', R⁶' = independently of one another the same or different straight- or branched-chain, substituted or unsubstituted alkyls,
R¹', R²', R⁵', R⁶' = independently of one another and independently of R¹, R², R⁵ and R⁶ the same groups as R¹,
R¹⁰ = C₁–C₄-alkyl, —CH=CH2, —C CH, —CN, $$-\overset{O}{\underset{\|}{C}}-NH_2, \quad -COO^\ominus M^\oplus, \quad -COOCH_3 \text{ or}$$

$$-COOC_2H_5,$$

R¹¹ = an organic radical with at least one primary, secondary or tertiary amino group or at least one ammonium group,
R¹² = independently of R¹¹ the same groups as R¹¹ or —H, —OH, C₁–C₄-alkyl,
—COO M, —C CH, $$-\overset{O}{\underset{\|}{C}}-NH_2, \quad -\overset{O}{\underset{\|}{C}}-O-CH_3, \quad -\overset{O}{\underset{\|}{C}}-O-C_2H_5$$

or hydroxy-substituted C₁–C₄-alkyl or
R¹¹, R¹² = together the oxygen of a carbonyl group and $$R^{13} = -H, \quad -CH_3 \text{ or } -CH_2-\overset{O}{\underset{\|}{C}}-O^\ominus M^\oplus.$$

4. A process as claimed in claim 1, wherein the stable N-oxyl radical used is at least one representative from the group consisting of 4-hydroxy-2,2,6,6-tetramethyl-1-oxylpiperidine, 4-hydroxy-2,6-diphenyl-2,6-dimethyl-1-oxylpiperidine, 4-carboxy-2,2,6,6-tetramethyl-1-oxylpiperidine, 4-carboxy-2,6-diphenyl-2,6-dimethyl-1-oxylpiperidine, 3-carboxy-2,2,5,5-tetramethyl-1-oxylpyrrolidine, 3-carboxy-2,5-diphenyl-2,5-dimethyl-1-oxylpyrrolidine and the sodium or potassium salt of the sulfuric monoester of 4-hydroxy-2,2,6,6-tetramethyl-1-oxylpiperidine.

5. A process as claimed in claim 1, wherein the stable N-oxyl radical used is at least one whose molal solubility in the aqueous polymerization medium at 25° C. and 1 bar is 10⁻⁶ mol/kg.

6. A process as claimed in claim 1, wherein the stableleast one whose molal solubility in the aqueous polymerization medium at 25° C. and 1 bar is $10^{-3}$ mol/kg.

7. A process as claimed in claim 1, wherein the stable N-oxyl radical used is at least one whose molal solubility in the aqueous polymerization medium at 25° C. and 1 bar is greater than the corresponding molal solubility in the monomers to be polymerized.

8. A process as claimed in claim 1, wherein a free-radical polymerization initiator additionally used is peroxodisulfuric acid and/or one of its alkali metal salts.

9. A process as claimed in claim 1, wherein the monomers to be polymerized are composed to the extent of at least 85% by weight of monomers from the group consisting of styrene, vinyltoluene, $C_1$–$C_8$-alkyl (meth)acrylates and acrylonitrile.

10. A process as claimed in claim 1, wherein there is at least one change in the composition of the monomer mixture added during the course of the polymerization.

11. A process as claimed in claim 1, wherein the polymerization temperature is >100 to 180° C.

12. A process as claimed in claim 1, wherein the polymerization pressure is from 2 to 20 bar.

13. A process as claimed in claim 1, wherein the polymerization mixture is charged to the polymerization vessel at a temperature below 100° C., at this temperature a pressure above the vapor pressure of the polymerization mixture is established, and then the closed polymerization vessel is heated to the polymerization temperature which is above 100° C., and polymerization is carried out.

14. An aqueous polymer dispersion obtained by a process as claimed in claim 1.

15. The process as claimed in claim 1, wherein the polymerization pressure is from 4 to 10 bar.

16. The process as claimed in claim 1, wherein the polymerization pressure is from 5 to 7 bar.

* * * * *

UNITED STATES PATENT AND TRADEMARK OFFICE
CERTIFICATE OF CORRECTION

PATENT NO. : 6,696,533 B1  Page 1 of 1
DATED : February 24, 2004
INVENTOR(S) : Fischer et al.

It is certified that error appears in the above-identified patent and that said Letters Patent is hereby corrected as shown below:

<u>Title page, Item [54] and Column 1, line 1,</u>
Title, should read -- [54] STABLE N-OXYL RADICAL ASSISTED EMULSION POLYMERIZATION UNDER PRESSURE --

Signed and Sealed this

Twenty-fifth Day of May, 2004

JON W. DUDAS
*Acting Director of the United States Patent and Trademark Office*